350-96.25
SR
XR 3,104,324 CROSS REFERENCE SEARCH ROOM
TX3074T
X2530

Sept. 17, 1963 J. RABINOW 3,104,324

ELECTRO-OPTICAL SCANNING SYSTEM FOR READING MACHINES

Filed Nov. 22, 1957 3 Sheets-Sheet 1

INVENTOR
JACOB RABINOW

BY Max L. Libman
ATTORNEY

3104324
OR IN 250/227

INVENTOR

JACOB RABINOW

BY Max L. Libman

ATTORNEY

INVENTOR
JACOB RABINOW
BY Max L. Libman
ATTORNEY 3,104,324

ELECTRO-OPTICAL SCANNING SYSTEM FOR READING MACHINES

Jacob Rabinow, Takoma Park, Md., assignor to Rabinow Engineering Co., Inc., Rockville, Md., a corporation of Maryland Filed Nov. 22, 1957, Ser. No. 698,194
6 Claims. (Cl. 250—227)

This invention relates to scanning systems for character recognition machines wherein an image of a character is projected onto a mask, or other memory device, and where the degree of match between the character and the memory device enables the machine to determine which character it is seeing.

In devices for scanning a field of view, the efficiency of scanning is generally very low because the scanning element, which may be a flying spot of light or an aperture in a disc, must traverse the whole field while all that may be of interest may be a printed character on this field. This printed character may occupy not more than ten percent of the area of the field. It is obvious, therefore, that a scanning system which could follow the shape of the character would be much more efficient and would save a great deal of time. Such curve tracing techniques have, in fact, been suggested and tested. The difficulty with curve tracing mechanisms is that they require very sophisticated and complicated electronic circuits. If one uses a curve tracer in a closed loop (feedback) system, the curve tracer must have a response of 2 to 10 times higher than the desired output signal to be able to follow the curve closely. This is another way of saying that closed loop systems must have wider bandwidth than the signals they are to handle.

In the system of scanning which I have invented I use an open loop system because the images which I wish to examine are of a fixed shape and it is a major object of the invention to provide an equipment in which the scanning is confined only to the significant portions of the image. No time is lost in scanning useless areas.

In U.S. Patent No. 2,795,705, issued to me on Optical Coincidence Devices, and in the Reading Machine described in my co-pending U.S. patent application, Serial No. 545,877, filed November 9, 1955, now Patent No. 2,933,246, I show devices by means of which characters can be read by being projected onto a mask consisting of opaque areas with transparent images of the various characters. In both of the above mentioned disclosures are shown various scanning means for examining an essentially rectangular area in which a character may appear. The present invention discloses a means by which only the area of the character itself is examined. The rest of the area is not looked at, unless specific points of the area are of interest, then the new scanning means can examine such points of interest also.

A main object of my invention is to produce a simple high speed scanning device for a character recognition machine, or the like, and to do so with relatively simple means.

Another object is to provide a character recognition system of optimum speed and efficiency.

The specific nature of my invention as well as other objects and advantages thereof will clearly appear from a description of a preferred embodiment as shown in the accompanying drawing, in which.

Figure 4:
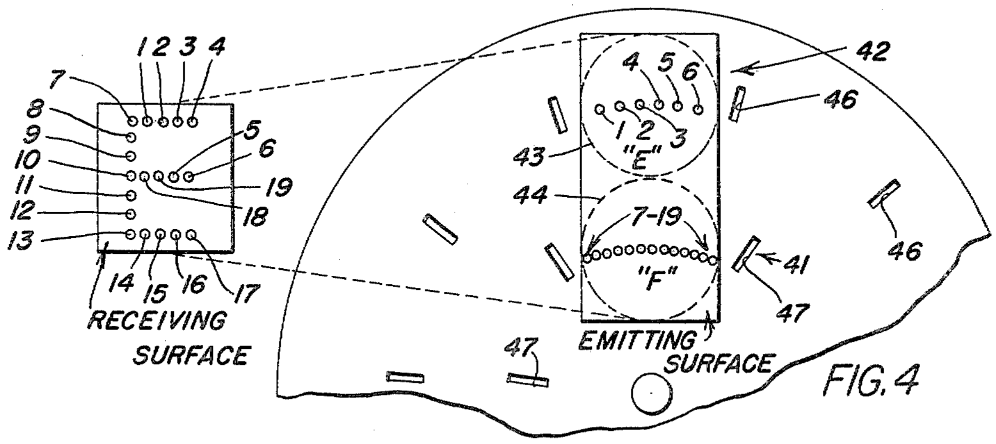
FIG. 4 shows the light pipes arranged for recognizing the letters "E" and "F"
Figure 7:
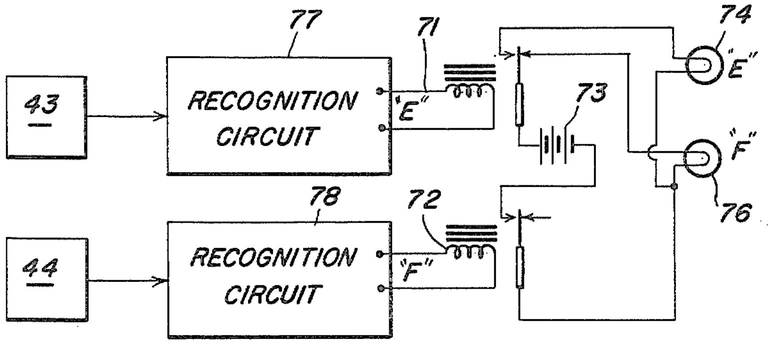
Figure 6:
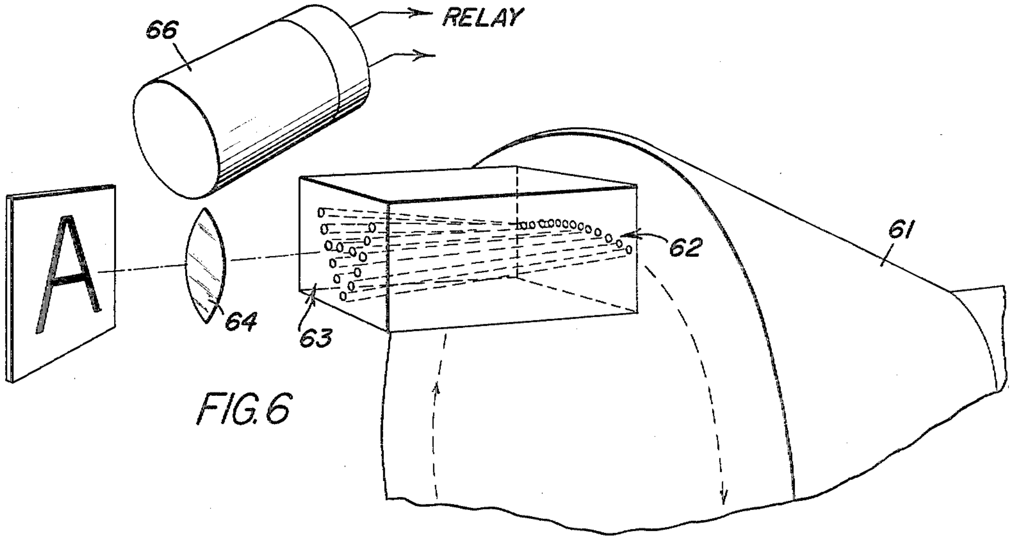
FIG. 6 shows my scanning system using a cathode ray to produce a flying spot.
Figure 6A:
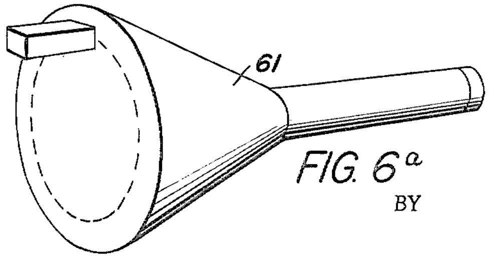

FIG. 6*a* is a reduced-scale perspective view showing more clearly the physical relationship of some of the elements of FIG. 6; and FIG. 7 is a circuit arrangement for use with FIG. 4.

At many points in this specification, reference will be made to "light pipes." These consist of rigid or flexible rods of transparent material which, by internal reflection, transmit light from one end to the other. Some of the commercial materials suitable for this purpose are plastics like Lucite and materials like glass. Those versed in this art will understand that the "light pipes" mentioned here are not hollow pipes but solid rods of suitable material. Tubes with internal reflecting surfaces can also be used but the more conventional Lucite rods have been found to be very satisfactory in practice. In any case, the mechanism of light transmission in such pipes is of little consequence to the present invention.

Figure 1:
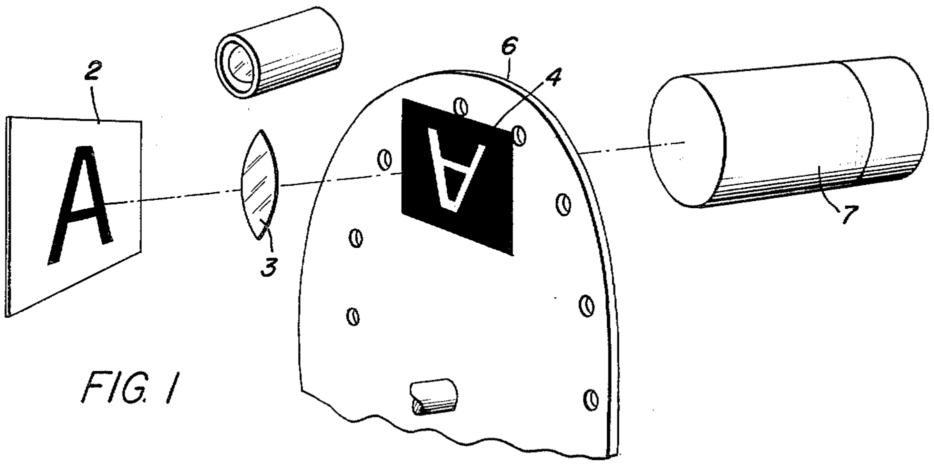
FIG. 1 is a schematic diagram showing the general optical system of reading a character by a scanned comparison device.

FIG. 1 shows the basic part of a character recognition machine where a dark printed character "A" on light background 2 is projected by a lens 3 onto a mask 4, which has a transparent "A" on an opaque background. Immediately behind this transparency is located a scanning disc 6 (which may be of the Nipkow type) having a set of spirally spaced holes for modulating the light passing through the mask. In line with the light which may pass through the mask and the scanning disc is the sensitive surface of a photocell 7 such as that of a conventional photomultiplier. If the transparency is suitably made, a match between the printed character and the transparency can be determined when all of the quantities of light passing through the Nipkow disc 6 are small as compared to the condition when an incorrect character appears in place of the printed "A." By using a suitable number of masks which are presented to the unknown character in succession, or by using a simultaneous comparison scheme such as described in my co-pending application Serial No. 545,877 previously referred to, and by using suitable electronic circuitry, the character can be identified. This application is not concerned with the details of reading machines as such, but only with means for improving the efficiency of scanning.

Figure 2:
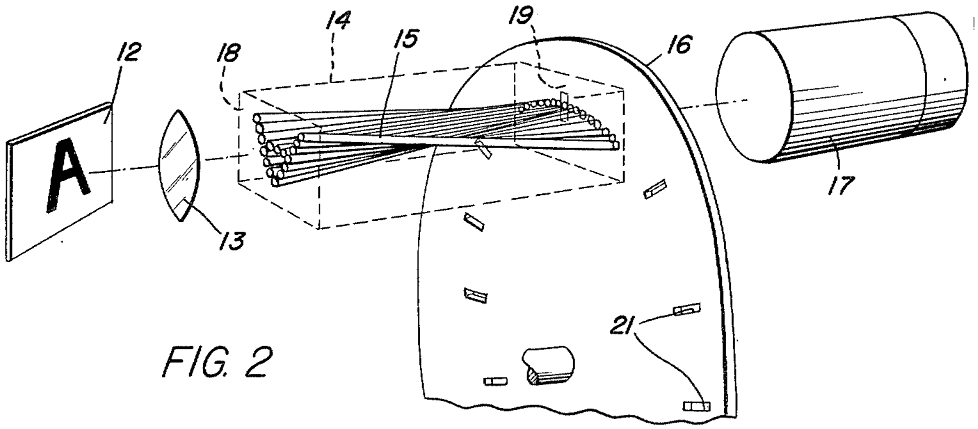
FIG. 2 is a schematic diagram showing the basic principle of my new scanning system.

FIG. 2 shows the basic principle of my inevntion. Instead of projecting the printed character "A" onto a mask, it is projected from background 12, through lens 13 onto a back of opaque material 14 in which are embedded a series of "light pipes" 15. Each of these light pipes has one end exposed at one surface 19 of the block 14, and its opposite end exposed at another surface of the block, as seen in FIG. 2. The surface 18 on which the character is projected by the lens shall be called the "light receiving" or, simply, the "receiving" surface. The surface 19 in which the opposite ends of the pipes are located I shall call the "light emitting" or, simply, the "emitting" surface.

It will be seen that one can arrange the receiving ends of the light pipes into any configuration and, by way of illustration, I arrange a group of them to form the letter "A" as seen in FIG. 2. The emitting ends of the same pipes are arranged into an arc of a circle. Since the pipes are flexible and can extend for any reasonable distance, such as several inches, between the two ends, this device permits great freedom in the relative arrangement of the receiving and emitting ends of the pipes.

Instead of a Nipkow disc scanner, I now place behind the emitting ends of the pipes a scanning disc 16 having a series of round holes or, preferably, small radial slots 21 arranged in a circle as shown in FIG. 2. I prefer to use the radial slots because slight errors in the radial position of the pipe emitter ends would cause no difficulty, while if I use small round holes, the ends of the pipes must be arranged in an arc corresponding to the pattern of the holes and the radial position of the pipes would be quite critical. Behind this new disc I place the photocell 17 as formerly.

Consider now what happens when the printed character "A" is projected onto the mask. Assume that the character "A" is moved in such a manner that the image of this character eventually falls on the receiving ends of the light pipes. The quantity of light passing through the pipes would then be quite small and the amount that would eventually reach the photocell from the emitting ends of the pipes would be quite small also. As the disc revolves, each slot in the disc scans the complete row of emitter ends, and the output of the photocell then is a function of the light received by the light pipes from the printed character.

If the light from a white paper is projected onto the light pipes, they all receive a great deal of light and the output of the photocell will also be large for successive positions of the scanning slot.

If an incorrect character, such as the letter "O" were projected on this arrangement of light pipes, some of the pipes would be covered and some would not, and the output of the photocell would consist of large and small bursts of current. The means to recognize such matches and mismatches are fully described in the patent disclosure referred to above.

It will be seen that by using light pipes, it is possible to transform any printed character, or any other image pattern, into a straight line or an arc or, in fact, into any other chosen pattern.

Figure 3:
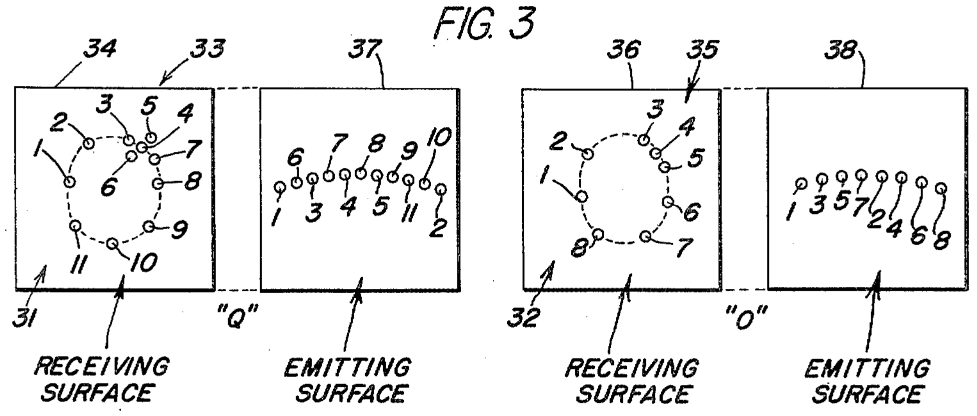
FIG. 3 shows a front view of the "light pipes" arranged for recognizing the letters "Q" and "O"

Moreover, the receiving ends and the emitter ends of the pipes can be arranged at will so that two pipes whose receiving ends are adjoining may have their emitter ends quite far apart. This has the great advantage that in some characters it is possible to arrange the transformation in such a way as to exaggerate the difference between two characters which may be otherwise very similar. In FIG. 3 are shown the receiving end and the emitter arrangements for light pipe bundles to recognize the letter "Q" and the letter "O." It will be seen that the pipes are spaced apart at the receiving ends 34 and 36 in locations such as 31 and 32 where no difference between the "O" and the "Q" are to be noted, and are bunched together at areas such as 33 and 35 which show the difference between the "O" and the "Q." The respective emitter ends 37 and 38 are shown in the same FIGURE and it will be note that the arrangement of the emitter ends is such that the pipes that are close together at the receiving end of each block are separated far apart at the emitter end. This is done so that the mismatch between the "O" and the "Q" will be exaggerated. This comes about because in the reading machines described in the patent and application referred to, certain types of peak detectors are used in which the output due the photocell "mismatch pulses" can be given greater weight if separated in time. Another way of saying this is that peak detectors which have a finite discharge time will produce larger average outputs if sequences of large current "spikes" are spread out over the whole scan interval.

Another point that will be noted is that it is possible to arbitrarily place more light pipes at points where differences must be studied, and that fewer elements can be used where there are no differences between characters.

FIG. 4 shows an arrangement of light pipes where some of the receiving ends are used to match the character and other are used as "guard" elements to detect the simultaneous condition of absence of dark areas outside of the character. The emitter ends are separated into two groups 41 and 42 and are fed to different photocells 43 and 44 respectively so that simultaneous examination can be made of the character which is normally dark and the guard elements which should, at that time, be light. For example, if one desires to distinguish between a capital "E" and a capital "F," the arrangement shown in FIG. 4 is used and it will be apparent that one can arrange the electronics so that if simultaneously both photocells 43 and 44 receive little light, the letter is read as an "E" while if the upper photocell receives a great deal of light while the bottom photocell 44 receives little light, the character is read as an "F." The scanning disc is, of course, modified to have two sets of slots 46 and 47 respectively so that both emitter groups can be read.

It will be understood that in FIG. 4 the image is inverted, so that the spots 7 to 19 correspond to the character "F," while all of the spots 1 to 19 correspond to "E." Thus if each photocell 43 and 44 actuates a relay, in the usual fashion, the circuit will be so arranged that actuation of the relay controlled by the tube 44, while the relay controlled by 43 is unactuated, will represent an "F" and can be used to control the "F" indicating circuit. Actuation of both relays will indicate an "E" and can be used to control the "E" indicating circuit and leave the "F" circuit unactuated.

FIG. 7 shows an example of such an arrangement. Photocells 43 and 44 actuate relays 71 and 72 respectively, and are shown in the unactuated position, wherein the voltage source 73 (represented as a battery) is not connected to either lamp 74 or 76. When an optical match corresponding to letter F occurs, relay 72 alone is actuated, and it can be readily seen that only lamp 76 (corresponding to letter F) will light; when an optical match corresponding to letter E occurs, both relays will be energized, and in that case lamp 76 will remain unlit, while lamp 74 will light.

Recognition circuits 77 and 78 may be of any suitable type, as previously noted, for example such as shown in my prior mentioned patent and patent application.

Figure 5:
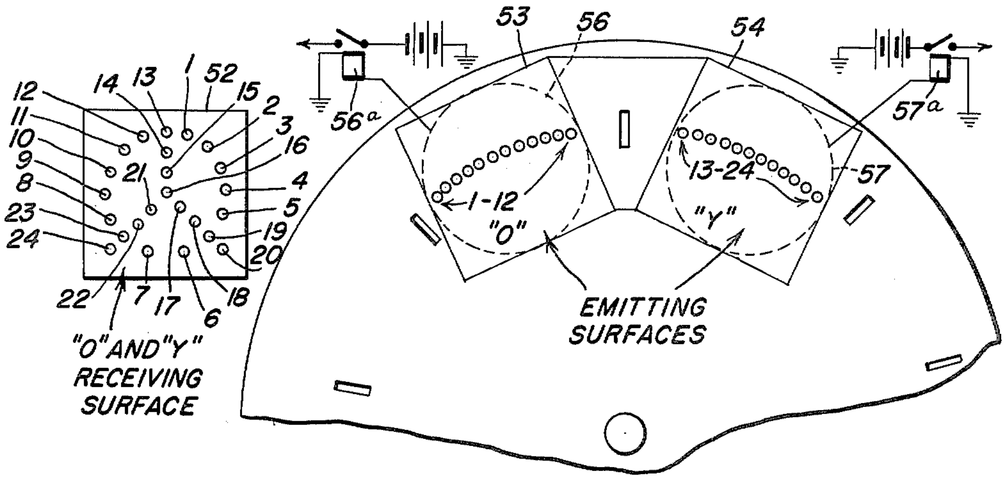
FIG. 5 shows light pipes arranged for examination of the letters "O" and "Y"

FIG. 5 shows an arrangement by which two entirely dissimilar characters may be examined at the same time. On receiving surface 52 are shown superimposed a "Y" and an "O" with the light pipes which feed the photocell to recognize the letter "O" marked by numerals 1 through 12 as shown, and the light pipes which feed the "Y" photocell marked by numerals 13 through 24. At common points (where the letters cross) one can do several things: leave out the light pipes entirely; or place a light pipe at each intersection and use these pipes for the character that has the smaller number of pipes; or divide the pipes at the common points between both characters.

At the emitting surface 53 appear pipes 1 through 12, which therefore identify the character "O," while at the emitting surface 54 appear pipes 13 through 24, which therefore identify the character "Y." Behind each of these emitting surfaces is a photocell, 56 and 57 respectively, and the circuitry associated with these photocells, e.g., relays 56*a* and 57*a*, therefore recognizes the letters "O" and "Y" respectively. It will be understood that in the previous figures there is required to be an emitting surface for each receiving surface and a photocell for each emitting surface, so that ordinarily one such complete assembly is required for each character to be recognized. The arrangement of FIG. 4 permits the use of fewer receiving surfaces with some economy of material and also permits greater compactness at the receiving end.

The scanning disc, if one is used, should preferably be large enough to accommodate a number of receiving surfaces corresponding to the number of characters to be recognized. This is readily possible because in practice the light pipes can be of very small diameter, e.g., 1/16 inch each (or less), so that a great many characters can be put into a very small space. However, it is also possible to use several scanning discs, which may be driven from the same motor, since the light pipes can be run for several feet, if necessary. In this way, scanning discs of smaller diameter can be used, where overall compactness is desired.

It will be seen therefore, that what I have invented in my system of scanning is to provide a transformation device by means of which any pattern which can be divided into small elemental areas can be transformed into another pattern much more suitable for high speed scanning. A transformation of a printed character into a straight line or into an arc of a circle is the most obvious example. I have also provided a means by which the number of scanned elements of a character or of a pattern can be reduced so that less time is lost in examining areas where the information content is low and more time and attention of the device can be devoted to areas of the character which are more significant. It should be noted that the system is primarily an "open loop" system and that very simple scanning devices can be employed.

Instead of the mechanical system shown, an electronic scanning device can be used. For example, an image dissector can be substituted for the disc scanner and phototube. A flying spot scanner can be substituted for the mechanical scanning system shown so far, as shown in FIGS. 6 and 6*a*. Here a flying spot of light produced by a cathode ray tube 61 illuminates the ends 62 of the pipes. The other ends 63 of the pipes emit light and this light is projected onto the printed character by the lens system 64. A photocell 66 picks up a portion of the light reflected from the character. This mechanism is the inverse of the mechanism shown in FIG. 2.

It will be apparent that the embodiments shown are only exemplary and that various modifications can be made in construction and arrangement within the scope of the invention as defined in the appended claims.

I claim:

1. A pattern sensing means comprising means to transform a generally irregular pattern of relatively dark and light value areas lying within a field of view into a predetermined linear pattern corresponding in value at all points therealong to the respective value areas of said irregular pattern in the field of view, said means comprising focussing means for forming an image of said field of view on a given surface; a plurality of distinct light receiving means located at said surface and arranged in a pattern covering less than the area of said field of view conforming to a desired pattern of said light and dark areas within the field of view and comprising only a portion of the entire field of view; a separate light transmission line at one end of each of said light receiving means; light emitting means at the other end of each said lines; the respective other ends of said transmission lines being arranged in a predetermined linear pattern different from said desired pattern; and sensing means relatively movable with respect to and along said linear pattern for sensing the correspondence in the pattern of said field of view and of said light receiving means.

2. In a pattern matching device for a plurality of unknown linear patterns on optically contrasting backgrounds; means for transforming only said unknown linear patterns to second linear patterns of configurations different from said unknown linear patterns without transforming said backgrounds in each transformation; said transforming means for said unknown linear patterns comprising a plurality of groups of light conducting elements, the elements of each group having two terminations; means for forming an image of a unknown pattern and its background; one of the terminations of each of the light conducting elements of one group arranged as a first set in linear correspondence with the image of only one of said unknown linear patterns so that the unknown pattern image without its background is presented to said first set of element terminations; the second terminations of the light conducting elements of said one group arranged as a second set in said different configuration; one of the terminations of each of the light conducting elements of each of the other groups arranged as sets in linear correspondence with the other unknown patterns without their backgrounds; and the second terminations of the elements of said other groups arranged as sets in configurations different from said last-mentioned patterns.

3. In a pattern recognition machine, means to project a field of view containing a linear pattern to be recognized onto a surface, a number of light conductive filaments having light receiving ends lying in said surface, said receiving ends being arranged in a configuration corresponding to one of a number of linear patterns to be recognized, the light emitting ends of said filaments being arranged in a different linear pattern corresponding to the path of an element of a scanning system arranged for examining the light emitted by said emitting ends, and photoelectric means to convert the output of said electrical scanning means into electrical signals.

4. In a character recognition machine, means to project the image of a character to be recognized onto a surface containing the ends of light conductive rods, said ends being arranged in a linear pattern to match the image of a character to be recognized, the other ends of said rods arranged in a substantially straight line, and means to scan said other ends of said rods, said last means comprising linear scanning means and including means for emphasizing a desired portion of a pattern to be recognized comprising a greater density of receiving ends clustered in the said portion than at the adjacent portions of said pattern.

5. In a character recognition machine, means to project the image of a character to be recognized onto a surface containing the ends of light conductive rods, said ends being arranged in a pattern to match the image of a character to be recognized, the other ends of said rods being arranged in an arcuate line, and means to scan said other ends of said rods, said last means comprising a rotary scanning means including means for emphasizing a desired portion of a pattern to be recognized comprising a greater density of receiving ends clustered in the said portion than at the adjacent portions of said pattern.

6. In a pattern recognition machine, means to project the image of a character to be recognized onto a surface, a number of light conductive rods having first ends thereof arranged in a linear pattern on said surface, said linear pattern corresponding to the superposed patterns of a plurality of characters having common portions and unique portions, the other ends of said rods being arranged in separate groups corresponding to unique portions of said superposed pattern, and means to separately scan the said separate groups.

(References on following page)

References Cited in the file of this patent

UNITED STATES PATENTS

| | | |
|---|---|---|
| Re. 21,105 | Round | May 30, 1939 |
| 1,751,584 | Hansell | Mar. 25, 1930 |
| 2,122,750 | Nicolson | July 5, 1938 |
| 2,196,166 | Bryce | Apr. 2, 1940 |
| 2,294,679 | Maul | Sept. 1, 1942 |
| 2,382,251 | Parker et al. | Aug. 14, 1945 |
| 2,397,202 | Potts | Mar. 26, 1946 |
| 2,552,156 | De France | May 8, 1951 |
| 2,573,405 | Clark | Oct. 30, 1951 |
| 2,583,132 | Altar et al. | Jan. 22, 1952 |
| 2,616,983 | Zworykin et al. | Nov. 4, 1952 |
| 2,663,758 | Shepard | Dec. 22, 1953 |
| 2,669,354 | Perrin | Feb. 16, 1954 |
| 2,695,964 | Schepker | Nov. 30, 1954 |
| 2,725,487 | Butler et al. | Nov. 29, 1955 |
| 2,759,602 | Baigent | Aug. 21, 1956 |
| 2,794,977 | Stoddart | June 4, 1957 |

FOREIGN PATENTS

| | | |
|---|---|---|
| 780,976 | Great Britain | Aug. 14, 1957 |

OTHER REFERENCES

Brouwer: Two-Dimensional Coding of Optical Images, Optica Acta, vol. 2, April 1955, pages 49–50.